United States Patent Office  3,788,894
Patented Jan. 29, 1974

3,788,894
METHOD OF MANUFACTURING AN MNOS STORAGE ELEMENT
Werner Scherber, Nordheim, Germany, assignor to Licentia Patent-Verwaltungs-G.m.b.H., Frankfurt am Main, Germany
Filed Dec. 23, 1971, Ser. No. 211,612
Claims priority, application Germany, Dec. 24, 1970, P 20 63 726.7
Int. Cl. C23c 11/14; H01g 7/00
U.S. Cl. 117—217                5 Claims

ABSTRACT OF THE DISCLOSURE

A method of manufacturing an MNOS storage element including forming an oxide layer by glow discharge treatment of the semiconductor body in oxygen, forming a nitride layer on the oxide layer by glow discharge treatment from the gases $SiH_4$ and $N_2$ and forming a metal layer on the nitride layer as a gate electrode.

BACKGROUND OF THE INVENTION

This invention relates to a method of manufacturing a MNOS storage element.

In semiconductor engineering, there exists so-called MNOS storage elements, the basic principle of which can be best explained with reference to a varactor. A varactor comprises a semiconductor body, the surface of which is provided with an oxide layer, a silicon nitride layer and a metal layer. Suitably, for example, the body comprises silicon, the oxide layer is silicon oxide and the metal layer is aluminium.

With known MNOS storage elements, the oxide layer is produced by thermal oxidation of the silicon semiconductor body whilst the nitride layer is produced by pyrolysis of $SiH_4$ and $NH_3$ at a temperature of about 800° C. It is desirable to make the oxide layers of less than 100 A. thick but such layers are difficult to reproduce by thermal means. In addition, with this known method, different apparatus are required for manufacturing the oxide and nitride layers.

SUMMARY OF THE INVENTION

It is an object of the invention to provide a method of producing an MNOS storage element in which the above disadvantages are reduced or eliminated.

According to the invention, there is provided a method of manufacturing an MNOS storage element comprising the steps of forming an oxide layer on a silicon semiconductor body by glow discharge treatment thereof in oxygen, forming a nitride layer on said oxide layer by glow discharge treatment from the gases $SiH_4$ and $N_2$, and thereafter forming a metal layer on said nitride layer as gate electrode.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
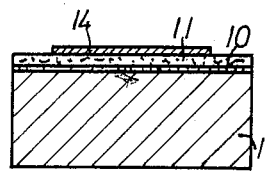
FIG. 1 shows the construction of a known varactor.

The basic principle of a so-called MNOS storage element is best explained with reference to a varactor. As shown in FIG. 1, such a varactor consists of a semi-conductor body 1, the surface of which is provided with an oxide layer 10, a silicon nitride layer 11 and a metal layer 14. The oxide layer may consist, for example, of silicon oxide, and the metal layer for example of aluminium. A suitable material for the semiconductor body is, e.g., silicon.

If an external voltage, the so-called charging voltage, is applied to such a storage element, there occurs under certain conditions in the insulator a charge shift which continues to exist for a long time, even after the charging voltage has been discontinued. A different state—due to discharge or recharge—may be produced only by applying a voltage of opposite polarity. This effect occurs only when the charging voltage exceeds a certain threshold value. The switching time of a storage element depends substantially on the thickness of the oxide layer so that very thin oxide layers with a thickness of 10 to 100 A. are already preferred for this reason.

In principle, the construction of the varactor agrees with the construction of the insulated gate electrode of a field effect transistor, if the semiconductor body adjacent to the insulated gate electrode is included. The processes occurring in the varactor may be detected by means of capacitance measurements, because charge shifts in the insulator cause changes in the capacitance of the semiconductor surface. In addition, the insulator charge affects the conductivity along the surface of the semiconductor so that current measurements yield corresponding data about the structure of the transistor.

Figure 2:
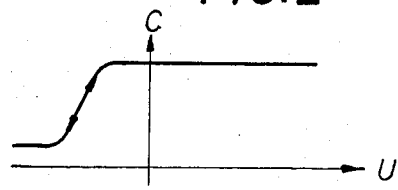
FIG. 2 is a graphical representation of the total capacitance of a varactor plotted as a function of the applied gate voltage.
Figure 3:
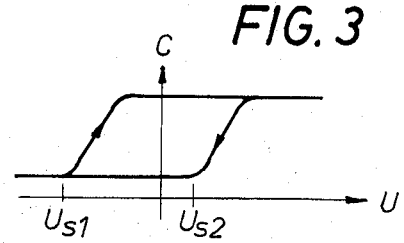
FIG. 3 is a graphical representation of the capacitance voltage characteristic of a varactor with a storage effect.
Figure 4:
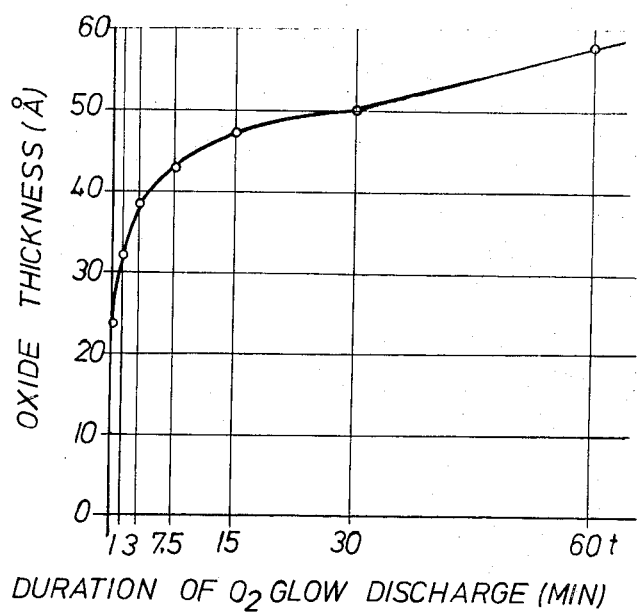
FIG. 4 is a graphical representation of the oxide thickness according to the invention plotted against the duration of the $O_2$ glow discharge treatment.

If the total capacitance of a variactor is plotted as a function of the applied gate voltage, the curve shown by way of example in FIG. 2 is obtained, if the semiconductor body is silicon with n-type conductivity. If the dielectric between the gate electrode and the semiconductor body has the above mentioned storage effect which is present with twin layers of silicon oxide and silicon nitride, one obtains in contradiction to FIG. 2 a kind of hysteresis curve for the capacitance-voltage characteristic of the varactor, as shown in FIG. 3. Thus, the C(U) curve is split between the forward and return sweeps, and a hysteresis curve is formed with a characteristic sense of rotation. The behaviour of the varactor may be directly related to that of a field effect transistor with insulated gate electrode. At a certain point of the capacitance curve in FIG. 2, the threshold voltage ($U_s$) of the field effect transistor may be expected. The hysteresis of the C(U) curve corresponds to the shift of the threshold voltage of the transistor ($U_{s1}-U_{s2}$), whilst the orientation of the C(U) hysteresis indicates the polarity of the gate voltage of the transistor necessary for a certain change of state.

The storage effect may be explained as follows. At the phase boundary between the nitride layer and the oxide layer, there is a particularly large number of traps. The energetic position of these traps corresponds substantially to the energy gap in the silicon. If these traps are now raised or lowered by an external field, a current can flow between the traps and the conduction band or valence band of the silicon, and the mentioned recharging occurs. With very thin oxide (60 A.), this current arises in consequence of electrons (defect electrons) which tunnel through the oxide layer. For this reason, a negative charging voltage applied to the metal layer produces a positive charging of the traps.

With known MNOS storage elements, the oxide layer is produced by thermal oxidation of the silicon semiconductor body, whilst the nitride layer is produced by pyrolysis of $SiH_4$ and $NH_3$ at a temperature of about 800° C. However, the known method has the disadvantage that oxide layers of less than 100 A. thickness are difficult to reproduce by thermal means. In addition, with this known method, different apparatus are required for manufacturing the oxide and nitride layers.

In an MNOS storage element produced according to the invention, these disadvantages can be reduced or eliminated. Basically, the invention proposes to realize this in an MNOS storage element with a silicon semiconductor, by producing the oxide layer by a glow discharge treatment of the semiconductor body in oxygen and the nitride layer by a glow discharge treatment from the gases $SiH_4$ and $N_2$.

The invention has the advantage of making possible a simple adjustment of the desired oxide layer thickness and hence of the switching period. Furthermore, an easily reproduced oxide-nitride boundary layer is achieved, because both processes are carried out in the same apparatus, and no change of apparatus is necessary. According to a further feature of the invention, the nitride layer is deposited from high-purity substances, i.e. $SiH_4$ and $N_2$, so that, for example, no undesirable ammonia is present. Another substantial advantage resides in the low manufacturing temperatures, because work is possible below 400° C. and even work at room temperatures is possible (nitride deposition). Owing to these low operating temperatures, no undesirable changes need be expected in the semiconductor body or oxide layer, caused by thermal influences.

Figure 5:
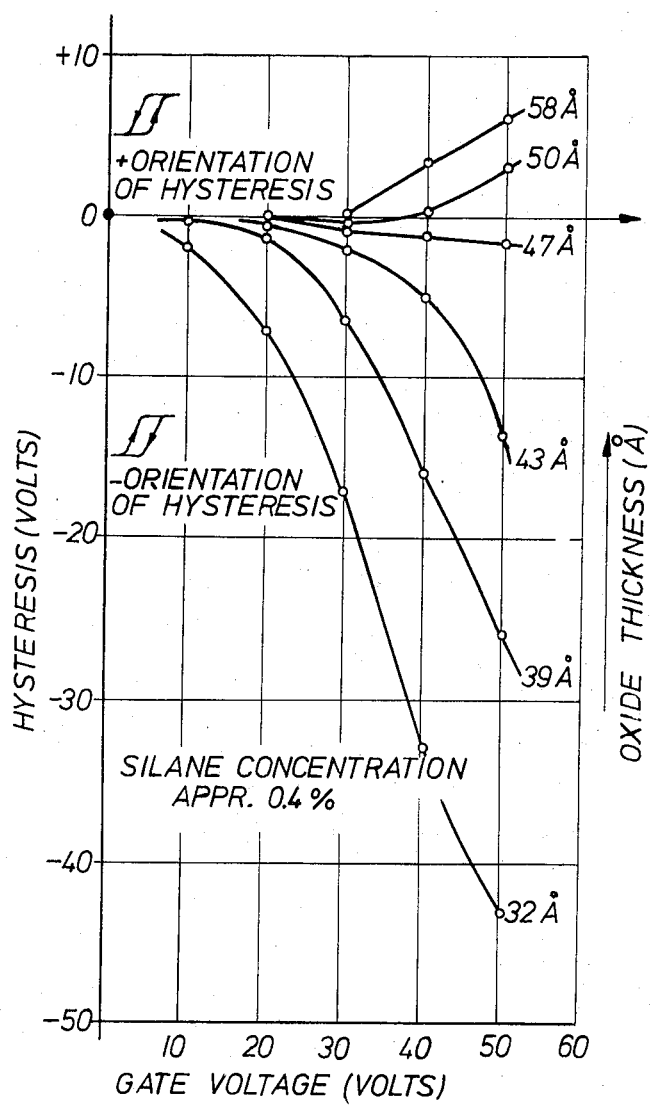
FIG. 5 is a graphical representation of the hysteresis of a storage element according to the invention plotted against the applied gate voltage.

The adjustment of the threshold voltage shift in the storage element, also called hysteresis, may be effected, for example, by suitably dimensioning the thickness of the oxide layer (FIG .4). The relationship between hysteresis and the applied gate voltage, may be seen, for example, from FIG. 5. In this figure, for example, a negative hysteresis is obtained with an oxide layer below 50 A., a very small hysteresis at about 50 A. oxide layer thickness, and a positive hysteresis at an oxide layer thickness exceeding 50 A.

Figure 6:
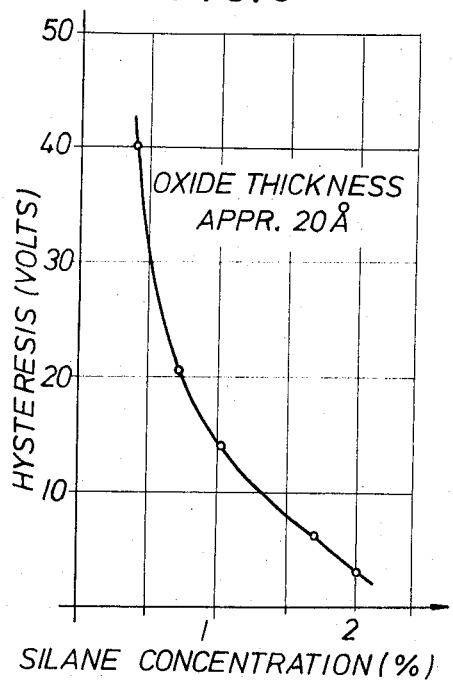
FIG. 6 is a graphical representation of the hysteresis of a storage element according to the invention as a function of the silane concentration.

However, the hysteresis may also be adjusted, for example, by means of the silane concentration during deposition of the nitride, as shown in FIG. 6. FIG. 6 shows the hysteresis as a function of the silane concentration at a certain oxide thickness, amounting in this embodiment to about 20 A.

Figure 7:
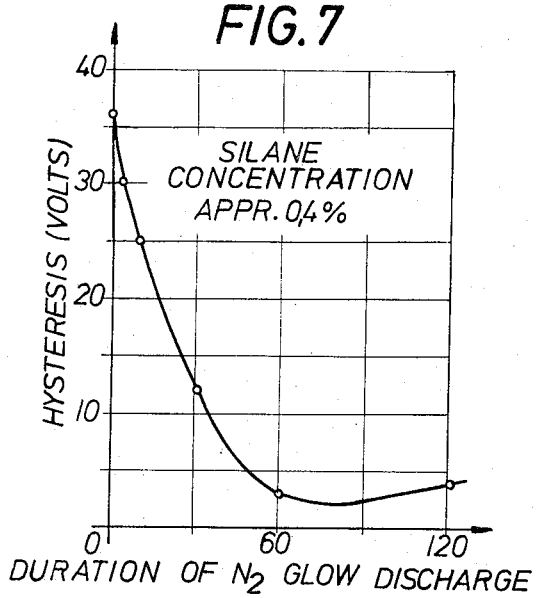
FIG. 7 is a graphical representation of the hysteresis of a storage element according to the invention as a function of the duration of a nitrogen glow discharge treatment.

Another possibility of adjusting the hysteresis comprises a nitrogen glow discharge treatment prior to the deposition of the nitride. FIG. 7 shows the hysteresis as a function of the duration of the nitrogen glow discharge treatment.

The invention will be further described with reference to an MNOS storage transistor.

Figure 8:
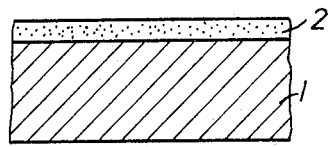
FIG. 8 is a sectional view of an MNOS storage transistor at a first stage of the method according to the invention.
Figure 9:
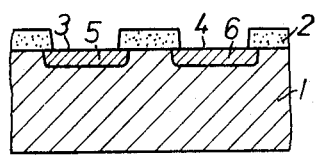
FIG. 9 is a view similar to FIG. 1, but showing a second stage of the method.

The manufacture of such a storage transistor may be based, for example, as shown in FIG. 8, on a semiconductor body 1 of silicon; on one of its surfaces, a thermally grown silicon dioxide layer 2 is produced as diffusion mask for diffusing the source and drain electrodes. Then, as shown in FIG. 9, diffusion windows 3 and 4 are made in the silicon dioxide layer 2, through which the source 5 and the drain 6 are diffused into the semiconductor body 1. If the semiconductor body 1 has n-type conductivity for example, the source and the drain have p-type conductivity.

Figure 10:
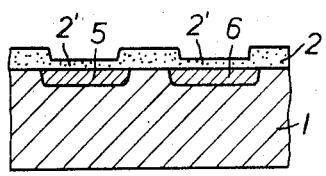
FIG. 10 is a view similar to FIG. 1, but showing a third stage of the method.
Figure 11:
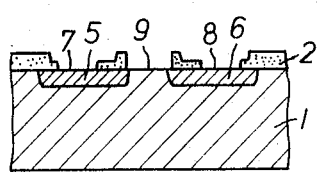
FIG. 11 is a view similar to FIG. 1, but showing a fourth stage of the method.
Figure 12:
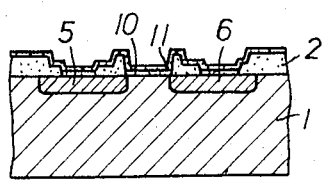
FIG. 12 is a view similar to FIG. 1, but showing a fifth stage of the method.

After the diffusing in of the source and drain electrodes, a new oxidation is effected so that the regions exposed through the diffusion windows are again covered by a silicon dioxide layer 2' as shown in FIG. 10. Then, according to FIG. 11, contact windows 7 and 8 are made for contacting the source and drain eelctrodes. Simultaneously, as also shown in FIG. 11, the part (9) of the surface is exposed, on which the gate electrode is provided. Since this is an insulated gate electrode with MNOS structure, first, as shown in FIG. 12, the insulating layer is produced for the gate electrode in the form of a silicon dioxide layer 10 and a silicon nitride layer 11. Both these layers are produced according to the invention by a glow discharge. Whilst the silicon dioxide layer 10 is produced by a glow discharge treatment of the silicon semiconductor body in oxygen, the silicon nitride layer 11 is produced by a glow discharge treatment from the gases $SiH_4$ and $N_2$. The substrate temperature for manufacturing the nitride layer is, for example, 350° C. Whilst the silicon oxide layer 10 may have a thickness of, e.g. 50 A., the thickness of the nitride layer 11 may amount to e.g., 1000 A.

Figure 13:
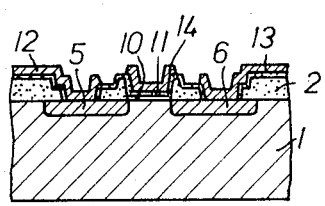
FIG. 13 is a view similar to FIG. 1, but showing a final stage of the method.

After the manufacture of the insulating layers 10 and 11, these layers are again removed from the regions of the contact windows 7 and 8 for the source and drain electrodes, as shown in FIG. 13, whilst they are, of course, left in the zone of the gate electrode. Finally, the source contact electrode 12, the drain contact electrode 13 and the gate electrode 14 are mounted, preferably by evaporation. The material for these electrodes may be, for example, aluminium.

It will be understood that the above description of the present invention is susceptible to various modification changes and adaptations.

What is claimed is:

1. A method of manufacturing an MNOS storage element having a desired hysteresis comprising the steps of forming an oxide layer having a predetermined thickness on a silicon semiconductor body by glow discharge treatment thereof in oxygen, said thickness being determined by said desired hysteresis, forming a nitride layer on said oxide layer by glow discharge treatment from the gases $SiH_4$ and $N_2$ at a temperature below 400° C. in the same apparatus as that in which said oxide layer is formed, and thereafter forming a metal layer on said nitride layer as a gate electrode.

2. A method as defined in claim 1, and comprising forming said oxide layer as a layer of silicon dioxide of a thickness between 20 A. and 200 A. and forming said nitride layer as a layer of silicon nitride of a thickness between 500 A. and 2000 A.

3. A method of manufacturing an MNOS storage element comprising the steps of forming an oxide layer on a silicon semiconductor body by glow discharge treatment thereof in oxygen, carrying out a nitrogen glow discharge treatment of said oxide layer, forming, after said nitrogen glow discharge treatment, a nitride layer on said oxide layer by glow discharge treatment from the gases $SiH_4$ and $N_2$, at a temperature below 400° C. in the same apparatus as that in which said oxide layer is formed, and thereafter forming a metal layer on said nitride layer as a gate electrode.

4. A method as defined in claim 3, and comprising controlling the hysteresis of the storage element by control of the duration of said nitrogen glow discharge treatment.

5. A method as defined in claim 3, and comprising forming said oxide layer as a layer of silicon dioxide of a thickness between 20 A. and 200 A. and forming said nitride layer as a layer of silicon nitride of a thickness between 500 A. and 2000 A.

References Cited
UNITED STATES PATENTS

| | | | |
|---|---|---|---|
| 3,549,911 | 12/1970 | Scott | 317—235 AZ |
| 3,424,661 | 1/1969 | Androshuk et al. | 117—93.1 GD |
| 3,394,066 | 7/1968 | Miles | 117—93.1 GD |

OTHER REFERENCES

Aboaf: IBM Technical Disclosure Bulletin, vol. 14, No. 1, June 1971, p. 155.

Kaplan: IBM Technical Disclosure Bulletin, vol. 13, No. 5, October 1970, p. 1268.

WILLIAM D. MARTIN, Primary Examiner

J. H. NEWSOME, Assistant Examiner

U.S. Cl. X.R.

117—71 R, 93.1 GD, 118, Dig. 12; 148—6.3; 317—235 AZ